(12) United States Patent
Moersch et al.

(10) Patent No.: US 11,125,372 B2
(45) Date of Patent: Sep. 21, 2021

(54) COUPLING, AND METHOD FOR TRANSFERRING FLUIDS

(71) Applicant: WEH GmbH Verbindungstechnik, Illertissen (DE)

(72) Inventors: Nicola Moersch, Illerrieden (DE); Raphael Mayer, Vöhringen (DE); Stefan Müller, Babenhausen (DE)

(73) Assignee: WEH GmbH Verbindungstechnik, Illertissen (DE)

( * ) Notice: Subject to any disclaimer, the term of this patent is extended or adjusted under 35 U.S.C. 154(b) by 0 days.

(21) Appl. No.: 17/047,932

(22) PCT Filed: Apr. 16, 2018

(86) PCT No.: PCT/IB2018/052634
§ 371 (c)(1),
(2) Date: Oct. 15, 2020

(87) PCT Pub. No.: WO2019/202360
PCT Pub. Date: Oct. 24, 2019

(65) Prior Publication Data
US 2021/0108750 A1    Apr. 15, 2021

(51) Int. Cl.
*F16L 37/23*    (2006.01)
*F16L 37/44*    (2006.01)
*F16L 37/34*    (2006.01)

(52) U.S. Cl.
CPC .............. *F16L 37/23* (2013.01); *F16L 37/44* (2013.01); *F16L 37/34* (2013.01); *F16L 2201/20* (2013.01)

(58) Field of Classification Search
CPC . F16L 37/23; F16L 37/44; F16L 29/02; F16L 29/04
(Continued)

(56) References Cited

U.S. PATENT DOCUMENTS 8,641,013 B2 * 2/2014 Liu .................. F16L 37/42
251/149.9
9,664,319 B2 * 5/2017 Weiland et al. ........ F16L 29/02
(Continued)

FOREIGN PATENT DOCUMENTS

DE    102004014461 A1    11/2004
DE    12005002696 B4    4/2009
(Continued)

OTHER PUBLICATIONS

International Search Report and Written Opinion for PCT/IB2018/052634 dated Dec. 14, 2018.

*Primary Examiner* — Kevin L Lee

(57) ABSTRACT

The invention relates to a coupling 10 for transferring fluids, having a valve 30, the valve tappet 32 of which is coupled in terms of movement with a valve sleeve 31, which is pre-tensioned by spring force in the flow direction D of the fluid, and having a locking mechanism 40 for releasably locking the coupling 10 to a tank nipple 50, and a securing mechanism 60 for releasably blocking the closed valve 30, wherein the locking mechanism 40 and the securing mechanism 60 are coupled in terms of movement via a sliding sleeve 70 which is pre-tensioned by spring force against the flow direction D of the fluid, so that in a first control position A of the sliding sleeve 70, the locking mechanism 40 is unlocked and the valve 30 is closed, and in a second control position B of the sliding sleeve 70, the securing mechanism 60 unlocks the valve sleeve 31, so that the valve 30 is unblocked and at least partially opened, and the valve sleeve 31 can be moved subject to pressure against the flow direction D of the fluid, wherein the securing mechanism 60 locks the sliding sleeve and completely opens the valve 30.

25 Claims, 3 Drawing Sheets

(58) Field of Classification Search
 USPC .................................................. 251/149.6
 See application file for complete search history.

(56) References Cited

U.S. PATENT DOCUMENTS

| 2012/0181465 A1* | 7/2012 | Rusconi | F16L 37/36 |
| | | | 251/149.6 |
| 2014/0264118 A1 | 9/2014 | Tiberghien et al. | |
| 2015/0377398 A1 | 12/2015 | Kamimura et al. | |

FOREIGN PATENT DOCUMENTS

| EP | 2273177 A1 | 1/2011 |
| FR | 2686680 A1 | 7/1993 |

\* cited by examiner

COUPLING, AND METHOD FOR TRANSFERRING FLUIDS

PRIOR ART

The invention relates to the technical field of refueling equipment and in particular to a coupling for transferring fluids according to claim 1, a method for transferring fluids according to claim 16 and a preferred use of said coupling according to claim 18.

In the hydrogen refueling of fuel cell vehicles, the vehicle is connected to the dispenser of a filling station via a filling coupling and a hose connected thereto. In doing so, it must be ensured, that in the case of a coupling which is not or not correctly connected to the vehicle-side refueling valve, no medium can escape in the case of a coupling acted upon by pressure. Furthermore, it is to be prevented, that the coupling does not come off of said refueling valve in the event that it is subjected to pressure, if it is not correctly connected to the refueling valve. In addition, a disconnection of the tank coupling may not be possible at an existing internal pressure greater than a low, permissible residual pressure.

The patent application US 2015/0377398 A1 discloses a coupling element having a valve element, which opens and closes a fluid channel, and having an indicator element, which allows an open or closed state of the valve element to be detected from the outside through a window.

Problem Addressed by the Invention

A problem addressed by the invention to provide a coupling for transferring fluids, which coupling is to be connected in a manner which is reliable as well as leakproof and is nevertheless particularly easy to handle for a user.

Solution of the Problem

Said problem is solved by a coupling for transferring fluids, having a central fluid channel and a valve arranged therein, the valve tappet of which is coupled in terms of movement to a valve sleeve which is pre-tensioned by spring force in the flow direction of the fluid, and having a locking mechanism for releasably locking the coupling to a tank nipple, and a securing mechanism for releasably blocking the closed valve, wherein the locking mechanism and the securing mechanism are coupled in terms of movement via a sliding sleeve which is pre-tensioned by spring force against the flow direction of the fluid, so that in a first control position of the sliding sleeve, the locking mechanism is unlocked and the valve is closed, and in a second control position of the sliding sleeve, the securing mechanism unlocks the valve sleeve, so that the valve is unblocked and at least partially opened, and the valve sleeve can be moved subject to pressure against the flow direction of the fluid, wherein the securing mechanism locks the sliding sleeve and opens the valve. The initially at least partial opening of the valve ensures, that the coupling can be completely deaerated on the outlet side by the fuel pump or the dispenser.

An essential point of the coupling according to the present invention is that it only has to be pushed onto a tank nipple for the connection and then automatically snaps into place. Only pulling on a lever is required for the disconnection. By means of the combination consisting of a locking mechanism coupled in terms of movement and a pressure-assisted securing mechanism, it is ensured that when the coupling is placed on a tank nipple said coupling automatically locks on said tank nipple. In addition, when pressure is applied, said mechanisms prevent the coupling from being released from the refueling nipple and said coupling can only be released from the refueling nipple when the pressure falls below a low, permissible residual pressure again. As a result, a reliable and leakproof connecting and disconnecting of the coupling is provided. The functional integration of the locking and securing mechanism via the sliding sleeve thereby permits a particularly simple handling of the coupling by the user.

PREFERRED EMBODIMENTS

The preferred embodiments of the present invention are indicated in the respective dependent claims.

In a first preferred embodiment of the coupling according to the present invention, it is provided, that the locking mechanism comprises a locking sleeve which is pre-tensioned by spring force in the flow direction of the fluid, locking elements movably arranged radially to the central fluid channel, and a blocking mechanism for releasably blocking the sliding sleeve, wherein the locking mechanism, the sliding sleeve and the locking elements are coupled in terms of movement with one another via the locking sleeve such that, in a first stroke position of the locking sleeve, the sliding sleeve is blocked in its first control position, wherein the locking elements are held in an outer radial position, and in a second stroke position of the locking sleeve the sliding sleeve is released and is in its second control position, wherein the locking elements are pressed by the sliding sleeve into an inner radial position and held there. The functional integration of the locking and blocking mechanism via the locking sleeve that is moved by the tank nipple thereby also contributes to a simple, reliable handling of the coupling by the user.

In a preferred further development of this embodiment, it is thereby provided that the blocking mechanism comprises at least one ball, which can engage alternately into corresponding grooves either on the sliding sleeve or the locking sleeve. Thus, a particularly simple and reliable structural solution is created for the engagement of the ball in the sliding sleeve and locking sleeve, which, depending on the stroke position of the locking sleeve, permits a release or blocking of the sliding sleeve.

In a further preferred development of this embodiment, it is additionally provided that the locking mechanism comprises at least one blocking groove, the depth of which is selected such that the stroke of the sliding sleeve between the first and second control positions is blocked. When the locking sleeve is moved without a tank nipple, the at least one ball first engages in this securing groove. Since the securing groove has an excessively low depth and the sliding sleeve cannot pass the at least one ball, the sliding sleeve is blocked by the at least one ball. As a result, the sliding sleeve is prevented from being released against the direction of flow of the fluid and the valve is prevented from being opened.

In a still further preferred development of this embodiment, it is also provided that the locking elements are designed as circular blocking segments, which are arranged radially to the fluid channel, which locking elements permit a particularly simple and reliable structural design of the locking mechanism. This is because, on the one hand, the blocking segments can be designed such that they engage behind the tank nipple over a particularly wide circumferential section and thus produce a particularly stable connection between the coupling and the tank nipple. Since these blocking segments are pressed radially inward solely by movement of the sliding sleeve, a corresponding spring pre-tensioning is also unnecessary. In principle, however, it is also possible to design the locking elements as simple radial pins, which are guided in corresponding bores, if the specific requirements of the coupling permit this.

In a further preferred embodiment of the coupling according to the present invention, it is provided, that the securing mechanism comprises securing elements, which are movably arranged radially to the central fluid channel, for releasably blocking the valve sleeve against retaining elements, wherein the securing elements are coupled with one another in terms of movement via the sliding sleeve and the valve sleeve, such that in the first control position of the sliding sleeve, the securing elements are latched in an inner radial position on the valve sleeve, and the closed valve is blocked, and in the second control position of the sliding sleeve, the securing elements are pressed by the valve sleeve into an outer radial position, in which the valve sleeve is released and the valve is at least partially opened. In this way, a complete valve opening is ensured in a structurally simple and reliable manner only when the coupling is securely connected to a tank nipple.

In a preferred further development of this embodiment, it is thereby provided that the valve sleeve has at least one circumferential step for latching the securing elements, as a result of which a reliable engagement of the securing elements is always ensured even in the event of a potential rotation of the valve sleeve about its longitudinal axis. In particular, this also makes the need for a corresponding axial guidance of the valve sleeve unnecessary.

In a further preferred development of this embodiment, it is additionally provided that the sliding sleeve is coupled in terms of movement with the valve sleeve via at least one control pin guided axially to the central fluid channel. In a previously defined control position, the sliding sleeve thereby carries the control pin, which in turn moves the valve sleeve against its spring pre-tensioning and in the process presses the securing elements radially outwards into a receptacle of the sliding sleeve. As a result, a particularly simple control of the securing mechanism is possible.

In a still further preferred development of this embodiment, it is also provided that the length of the control pin guided axially to the central fluid channel is dimensioned such that, in order to lock the locking mechanism and to subsequently unblock the securing mechanism, an offset distance has to be overcome before the valve (30) at least partially opens. The valve sleeve is thereby moved around this offset distance against its spring pre-tensioning to such an extent that the valve tappet coupled with it in terms of movement can lift off from a sealing piston and at least partially opens the valve. As a result, increased security against an immediate complete valve opening is provided, which can only take place when pressure is applied.

In a still further preferred development of this embodiment, it is also provided that the at least one control pin guided axially to the fluid channel abuts against the valve sleeve via an annular pressure disk. This results in a larger contact surface for the control pin, which also ensures a more uniform pressure distribution over the circumference of the valve sleeve. Due to the circumferential pressure disk, no axial guidance of the valve sleeve is in turn required, which always positions the latter exactly against the control pin.

In a further preferred embodiment of the coupling according to the present invention, it is provided that the valve is designed in such a way that its opening width can be changed as a function of a change in pressure of the fluid. This pressure-dependent opening width ensures that the valve is opened completely only when the filling pressure is completely built up, but drops back again into its only partially open position with decreasing filling pressure or at residual pressure.

In a further preferred embodiment of the coupling according to the present invention, it is provided that a spring pre-tensioning of the valve sleeve is selected such that the valve can only be closed and blocked, when falling below a fluid pressure, by moving the valve sleeve and the sliding sleeve. As a result, a disconnecting of the coupling from a tank nipple is only possible when a residual pressure is reached, which reliably excludes the undesired escape of a fluid from a tank nipple when disconnecting the coupling.

In a further preferred embodiment of the coupling according to the present invention, it is provided that a spring pre-tensioning of the valve sleeve is selected such that the valve can only be completely opened when a fluid pressure is exceeded, by moving the valve sleeve and the sliding sleeve, and in the process blocks the sliding sleeve. In particular, it is thereby provided that opening of the valve can only take place when a filling pressure of 5 bar is exceeded, as a result of which additional security against unstable filling ratios or a coupling which is not yet completely deaerated is provided.

In a further preferred embodiment of the coupling according to the present invention, it is provided that the valve is designed in such a way that its opening width is fixed starting from a defined fluid pressure, as a result of which unstable filling ratios are likewise excluded and in particular no undefined fluid transfer can occur under overpressure.

In a further preferred embodiment of the coupling according to the present invention, a hand lever mechanism is provided, by means of which the sliding sleeve can be moved from the second position into the first position in order to decouple the coupling from a tank nipple. To ensure the secure and reliable connection of the coupling to a tank nipple, merely its pushing on is necessary and merely a single decoupling actuation is necessary to disconnect the coupling, which makes handling of the coupling—despite high filling pressures, for example, of a gaseous fluid—extremely easy for the user.

In a further preferred embodiment of the coupling according to the present invention, a data interface, in particular a manually exchangeable data interface for providing refueling information, is provided. Such a data interface, ideally operating on an infrared basis, is preferably located at the front end of the coupling and is responsible for the communication between a vehicle and a filling station and for achieving an optimum filling level. In the event of damage or a malfunction, until now, the complete coupling had to be sent in for repair. The exchangeable data interface can, however, be easily exchanged directly on site and in the shortest possible time, so that down times are shortened.

In a further preferred embodiment of the coupling according to the present invention, an LED display, preferably an OLED color display, is provided for displaying refueling information, in particular relating to a sequence of the refueling process. The user can thus read from it what is to be done next, which facilitates the refueling process and at the same time increases its safety. Ideally, the display is designed to be quite light-intensive and has a large viewing angle. The display does not thereby have to have any influence on the mechanical functions of the coupling, so that a connection, refueling and disconnection of the coupling is also possible without a display. In this way, the coupling can be operated, in particular, even with a damaged display, so that refueling is still possible.

In a further preferred embodiment of the coupling according to the present invention, a start button for signaling a refueling start request to a dispenser is provided on the coupling itself. The refueling process can thus be started directly on the coupling after the connection of the coupling. The start button thereby merely comprises a starting function, while an automatic stopping is carried out on the filling-station side when the tank is full, for example, in the case of a refueling for a fixed amount of money set in advance.

In a further preferred embodiment of the coupling according to the present invention, a grip region is insulated against cold and is preferably designed with a vacuum insulation. In this way, the latter has a pleasant temperature at any time for holding the coupling, which is best ensured by a vacuum insulation installed in the grip region.

In a further preferred embodiment of the coupling according to the present invention, the complete mechanism is covered by a continuous plastic sheath made of a weather-resistant material, so that clamping and crushing injuries to the fingers/hands of a user are reliably avoided.

The above problem is also solved by a method for transferring fluids with a coupling according to one of the preceding claims, in which, in a first control position of the sliding sleeve, the locking mechanism is unlocked and the valve is closed, and, during the transition into a second control position of the sliding sleeve, the securing mechanism unlocks the valve sleeve, so that the valve is unblocked and at least partially opened, and the valve sleeve is moved subject to pressure against the flow direction of the fluid, wherein the securing mechanism locks the sliding sleeve and the valve is completely opened.

An essential point of the method according to the present invention is that the functional integration of the different components permits a significantly simplified connection and disconnection of the coupling from a tank nipple. In addition to improved handling of the coupling by the user, however, a considerably increased safety and reliability are produced against incorrect connection, unstable filling ratios during refueling and undesired escape of fluid when disconnecting the coupling. In particular, the functional integration of the locking and securing mechanism via the sliding sleeve thereby plays a role which considerably simplifies the method and makes it unsusceptible to disturbances or even incorrect use.

In a first preferred embodiment of the method according to the present invention, it is provided that, in order to decouple the coupling from a tank nipple, the pressure of the fluid is lowered, the valve sleeve overcomes a filling pressure of the fluid in a spring-force driven manner, and the valve sleeve and the sliding sleeve are then displaced in the flow direction of the fluid via a hand lever mechanism, wherein the valve closes, the securing mechanism blocks the valve sleeve and releases the sliding sleeve, and the sliding sleeve is then moved into its first position. By establishing a spring force of the valve sleeve spring 37, it is ensured that a disconnection of the coupling from a tank nipple can only take place when falling below a previously defined residual pressure, just as an opening of the valve can only take place when a filling pressure, in particular a filling pressure of up to 5 bar, is exceeded. The method for connecting and disconnecting the coupling from a tank nipple is thus considerably more reliable and safer.

In a further preferred embodiment of the method according to the present invention, it is provided that a sequence of the refueling process is displayed on an LED display of the coupling, as a result of which a user of the coupling is safely guided through the refueling process.

In a further preferred embodiment of the method according to the present invention, it is provided that a refueling start request is sent to a dispenser via a start button of the coupling. In this way, a user of the coupling can control the entire refueling process from the coupling, which makes it considerably simpler, faster and additionally safer.

Because of the particularly simple handling and reliability and safety of the coupling according to the present invention, said coupling should preferably to be used for refueling vehicles with gaseous fluids, in particular with hydrogen.

It is understood that the features mentioned above and those yet to be explained below can be used not only in the respectively specified combination, but also in other combinations or alone, without departing from the scope of the present invention.

BRIEF DESCRIPTION OF THE FIGURES

Preferred embodiments of the invention are depicted in the drawings and are elucidated in detail in the description below, wherein the identical reference signs refer to the identical or similar or functionally identical components.

FIG. 1a shows a side view, in longitudinal section, of a coupling 10 according to the present invention, which is placed on a tank nipple 50. Said coupling has a fluid channel 20 with a valve 30 arranged therein, and is connected to the tank nipple 50 via a locking mechanism 40. Via a securing mechanism 60, the valve 30 can be unblocked and the locking mechanism can be blocked. For this purpose, when the coupling 10 is connected, a locking sleeve 41, which holds locking elements 42 in the open position, is pushed back from the refueling nipple 50 until the locking elements 42 move radially inward at a recess of the refueling nipple 50. The locking elements 42 are thereby pressed inward by a bevel on a sliding sleeve 70, which is pre-tensioned by a sliding sleeve spring 74. The sliding sleeve 70 consists of two partial sleeves, which are connected to one another via sliding pins 73. As a result, both partial sleeves move away from the tank nipple 50 from the control position A of the sliding sleeve 70 shown here. In addition, starting from a certain stroke of the sliding sleeve 70, a pressure disk 72 and thus also the valve sleeve 31 are moved away from the tank nipple 50 by means of control pins 71. As a result, the securing mechanism 60 is activated, the securing elements 61 of which are pushed radially outwards into a receiving groove 63 of the sliding sleeve 70. As a result, the valve tappet 32 is carried by a groove screw mounted in the valve sleeve 31, as a result of which the fluid channel 20 is opened. The opening of the fluid channel 20 takes place only after the tank nipple 50 is securely connected to the coupling 10. When pressure is applied, the valve sleeve 31, which is pre-tensioned by the valve sleeve spring 37, is displaced against a flow direction D of the fluid. This spring pre-tensioning ensures, that the coupling 10 can only be released from the tank nipple 50 starting from a low, permissible residual pressure. As a result of the displacement of the valve sleeve 31, the opening between the valve sleeve 31 and a flange sleeve 38 is closed and, by means of retaining elements 62 and securing elements 61, blocks a displacement of the sliding sleeve 70 and thereby also the unlocking of the coupling 10 from the tank nipple 50. Only when the pressurization has again fallen below the low, permissible residual pressure can the coupling 10 be released again from the tank nipple 50.

FIG. 1b shows the side view, in longitudinal section, of the coupling 10 according to the present invention of FIG. 1a, which is locked to the tank nipple 50. The user has thereby pressed the coupling 10 onto the tank nipple 50 in such a way that it has displaced the locking sleeve 41 against its spring pre-tensioning. As a result, the locking sleeve 31 compresses a locking sleeve spring 46 and activates a blocking mechanism 43, the balls 44 of which fall radially into grooves 45 of the locking sleeve 31. As a result, the sliding sleeve 70 is released and displaced by the sliding sleeve spring 74 into the second control position B shown here. The less deep blocking groove 45 thereby serves as a securing material against displacement of the locking sleeve 31, when no tank nipple 50 is inserted. The sliding pins 73 transfer the described movement of the sliding sleeve 70 from its left partial sleeve to its right partial sleeve. During this movement, the left partial half of the sliding sleeve 70 makes contact on approximately 50% of its path with control pins 71, which transfer their movement to a pressure disk 72, as a result of which the valve sleeve 31 is in turn displaced. Together with the flange sleeve 38, the valve sleeve 31 thereby guides the movement of the securing elements 61 out of their latching position on a step 33 of the valve sleeve 31, so that they are forced radially outwards into a receiving groove 63 of the sliding sleeve 70. The valve sleeve 31 thereby also displaces a groove screw 39, which is screwed into the valve sleeve 31 and lifts the valve tappet 32 off a sealing piston 36, so that a first opening width 34 of the valve 30 is reached. Only when the coupling 10 is thus connected and is under a filling pressure of more than 7 bar, is a receiving groove 63, in which the securing elements 61 are located in the second control position B of the sliding sleeve 70, closed by movement of the valve sleeve 31 against the flow direction D of the fluid. By the closing of the receiving groove 63, the securing elements 61 can no longer be displaced radially inwards by the sliding sleeve 70 and thus block the sliding sleeve 70 together with the retaining elements 62, since the latter are screwed to the housing of the coupling 10.

FIG. 1c shows the side view, in longitudinal section, of the coupling 10 according to the present invention of FIG. 1b, in which the valve 30 is completely open and a transfer of the fluid takes place. The user has thereby initiated the refueling process, as a result of which the built-up pressure has displaced the valve sleeve 31 against its valve sleeve spring 37. The valve sleeve thereby compresses the valve sleeve spring 37 and displaces the groove screw, which in turn displaces the valve tappet 32 and completely opens the valve 30, so that its maximum opening width 34 is used. Here, the sliding sleeve 70 is still in its control position B. The strength of the coupling 10 is thereby designed with a computational pressure of 1050 bar, so that an unexpected increase in pressure in a filling station cannot represent any danger to the coupling 10. The coupling 10 thereby also has a higher flow rate than conventional couplings, as a result of which the refueling time decreases. Overall, the coupling 10 has been designed for a high clock frequency, that is, for the refueling of a plurality of vehicles in a short time one after the other. For this purpose, a filter, in particular an integrated $5 \times 10^{-6}$ m mesh filter, is also arranged in the fluid channel 20 at the inlet of the coupling 10 (not visible in the figures), in order to protect the coupling 10 and also downstream systems from larger impurities, which filter can also be changed in the event of maintenance.

Figure 1A:
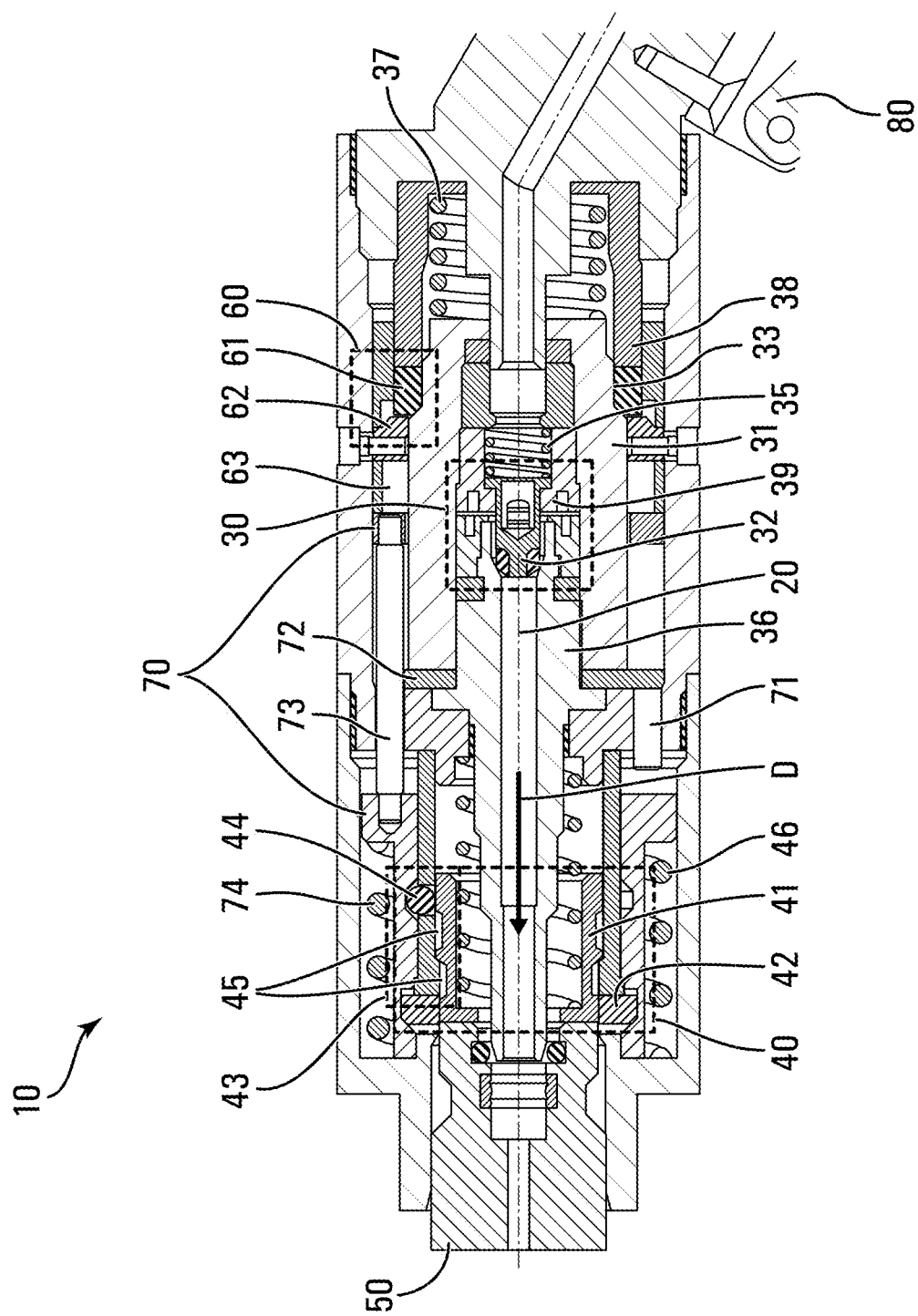
FIG. 1a shows a side view, in longitudinal section, of a coupling according to the present invention, which is placed on a tank nipple.
Figure 1B:
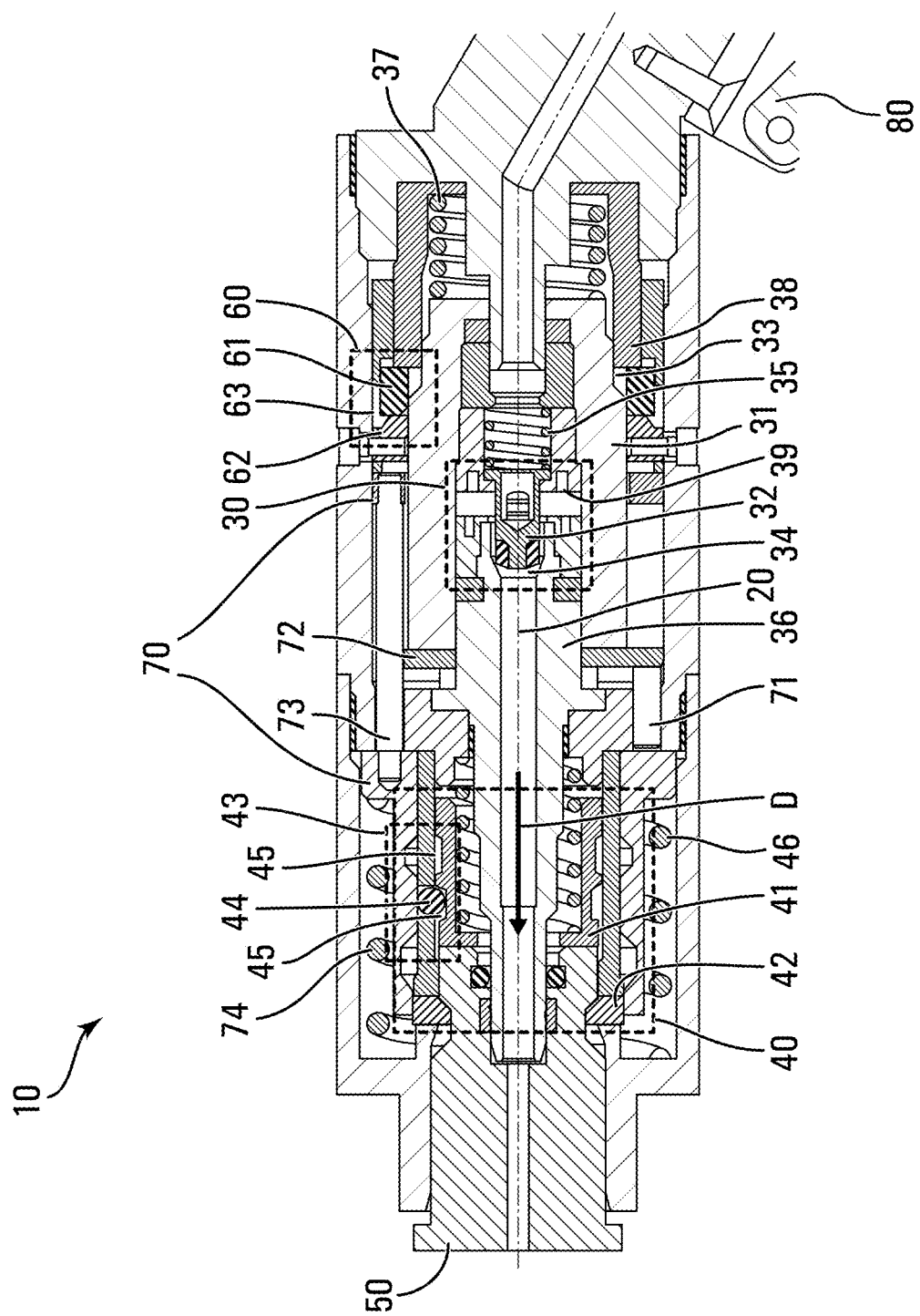
FIG. 1b shows a side view, in longitudinal section, of the coupling according to the present invention of FIG. 1a, which is locked on the tank nipple.
Figure 1C:
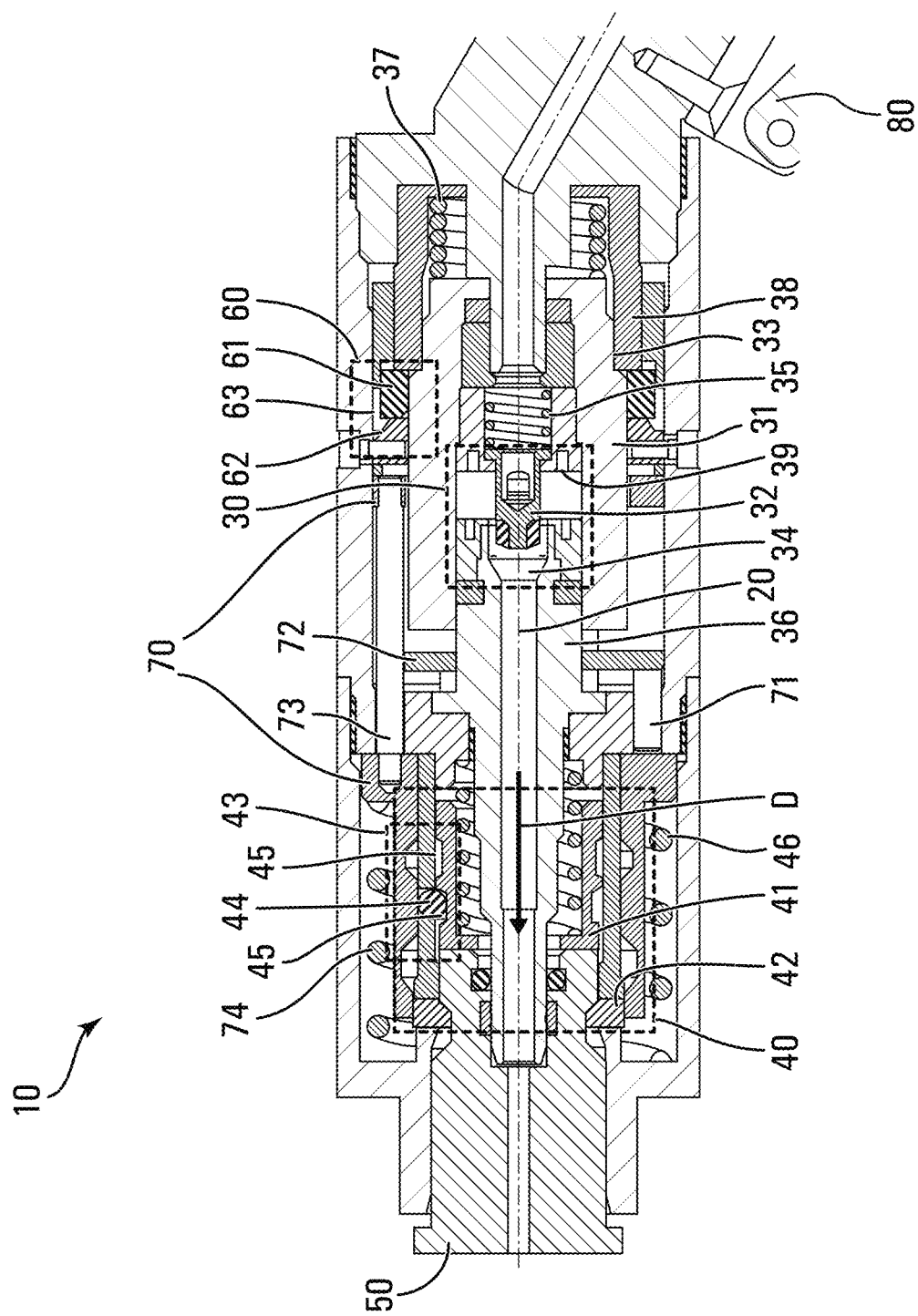
FIG. 1c shows a side view, in longitudinal section, of the coupling according to the present invention of FIG. 1b, in which the valve is completely open.

When refueling is completed, the coupling 10 is deaerated via the dispenser of a filling station. The valve sleeve spring 37 displaces the valve sleeve 31 again in the flow direction D of the fluid, wherein a valve spring 35 supported on the valve sleeve 31 transfers this movement to the valve tappet 32. The valve 30 is then about 90% closed. When the coupling 10 is connected and is no longer under filling pressure, it can be unlocked by actuating a hand lever mechanism 80, since the valve sleeve 31 no longer closes the groove, into which the securing elements 61 have been displaced during locking. The user then actuates the hand lever mechanism 80, which moves the sliding sleeve 70 to the left, moves the valve sleeve 31 along by means of the valve sleeve spring 37 and presses the valve tappet 32 onto the sealing piston 36 by means of the valve spring 35. The valve 30 is thus closed and the securing elements 61 move radially inward again. Both partial sleeves of the sliding sleeve 70 move from their control position B to the left back into their control position A and the user pulls the coupling 10 away from the tank nipple 50, wherein the locking elements 42 move radially outwards. The locking sleeve 41 is then displaced by the locking sleeve spring 46 in the flow direction D of the fluid, wherein the balls 44 are also moved radially outward, and blocks the locking elements 42 as well as the balls 44 while blocking the sliding sleeve 70 in its first control position.

In sum, the handling of a coupling, in particular when refueling with gaseous fluids under high pressure, such as hydrogen, is thus significantly simplified, wherein, in addition, an extremely reliable and safe refueling is ensured.

The invention claimed is:

1. A coupling for transferring fluids, having a central fluid channel and a valve arranged therein, a valve tappet of which is coupled in terms of movement with a valve sleeve which is pre-tensioned by spring force in the flow direction of the fluid, and having a locking mechanism for releasably locking the coupling to a tank nipple, and a securing mechanism for releasably blocking the closed valve, wherein the locking mechanism and the securing mechanism are coupled in terms of movement via a sliding sleeve which is pre-tensioned by spring force against the flow direction of the fluid, such that in a first control position of the sliding sleeve, the locking mechanism is unlocked and the valve is closed, and in a second control position of the sliding sleeve, the securing mechanism unlocks the valve sleeve, such that the valve is unblocked and at least partially opened, and the valve sleeve can be moved subject to pressure against the flow direction of the fluid, wherein the securing mechanism locks the sliding sleeve and completely opens the valve, and in which the locking mechanism comprises a locking sleeve which is pre-tensioned by spring force in the flow direction of the fluid, locking elements movably arranged radially to the central fluid channel, and a blocking mechanism for releasably blocking the sliding sleeve, wherein the blocking mechanism, the sliding sleeve and the locking elements are coupled in terms of movement with one another via the locking sleeve such that, in a first stroke position of the locking sleeve, the sliding sleeve is blocked in its first control position, wherein the locking elements are held in an outer radial position, and in a second stroke position of the locking sleeve the sliding sleeve is released and is in its second control position, wherein the locking elements are pressed by the sliding sleeve into an inner radial position and held there, and wherein the blocking mechanism comprises at least one ball, which can engage alternately into corresponding grooves either on the sliding sleeve or the locking sleeve.

2. The coupling according to claim 1, in which the blocking mechanism comprises at least one groove, the depth of which is selected such that the stroke of the sliding sleeve between the first and second control positions is blocked.

3. The coupling according to claim 1, in which the locking elements are circular blocking segments arranged radially to the fluid channel.

4. The coupling according to claim 1, in which the securing mechanism comprises securing elements movably arranged radially to the central fluid channel for releasably blocking the valve sleeve against retaining elements, wherein the securing elements are coupled with one another in terms of movement via the sliding sleeve and the valve sleeve such that, in the first control position of the sliding sleeve, the securing elements are latched in an inner radial position on the valve sleeve, and the closed valve is blocked, and in the second control position of the sliding sleeve, the securing elements are pressed by the valve sleeve into an outer radial position, in which the valve sleeve is released and the valve is at least partially opened.

5. The coupling according to claim 4, in which the valve sleeve has at least one circumferential step for latching the securing elements.

6. The coupling according to claim 1, in which the sliding sleeve is coupled in terms of movement with the valve sleeve via at least one control pin guided axially to the central fluid channel.

7. The coupling according to claim 6, in which the length of the control pin guided axially to the central fluid channel is dimensioned such that, in order to lock the locking mechanism and to subsequently unblock the securing mechanism, an offset distance has to be overcome, before the valve at least partially opens.

8. The coupling according to claim 6, in which the at least one control pin guided axially to the fluid channel abuts against the valve sleeve via an annular pressure disk.

9. The coupling according to claim 1, in which an opening width of the valve can be changed as a function of a change in pressure of the fluid, so that the valve is opened completely only when a filling pressure is completely built up, but returns to being partially opened when the filling pressure decreases or is at residual pressure.

10. The coupling according to claim 1, in which a spring pre-tensioning of the valve sleeve is selected such that the valve can only be closed and blocked when falling below a fluid pressure, by moving the valve sleeve and the sliding sleeve.

11. The coupling according to claim 1, in which a spring pre-tensioning of the valve sleeve is selected such that the valve can be opened completely only when a fluid pressure is exceeded, by moving the valve sleeve and the sliding sleeve, and thereby blocks the sliding sleeve.

12. The coupling according to claim 1, in which an opening width of the valve is fixed starting from a defined fluid pressure.

13. The coupling according to claim 1, in which a hand lever mechanism is provided, by means of which the sliding sleeve can be moved from the second position into the first position, in order to decouple the coupling from the tank nipple.

14. The coupling according to claim 1, in which a manually exchangeable data interface for providing refueling information is provided.

15. The coupling according to claim 1, in which an LED display is provided for displaying refueling information relating to a sequence of a refueling process.

16. The coupling according to claim 1, in which a start button for signaling a refueling start request to a dispenser is provided on the coupling itself.

17. The coupling according to claim 1, in which a grip region is insulated against cold.

18. The coupling according to claim 1, wherein the coupling is covered by a continuous plastic sheath made of a weather-resistant material.

19. The coupling according to claim 15, wherein the LED display is an OLED color display.

20. The coupling according to claim 17, wherein the grip region is designed with a vacuum insulation.

21. A method for transferring fluids having a coupling according to claim 1, in which, in a first control position of the sliding sleeve the locking mechanism is unlocked and the valve is closed, and during the transition into a second control position of the sliding sleeve the securing mechanism unlocks the valve sleeve, so that the valve is unblocked and is at least partially opened, and the valve sleeve is moved subject to pressure against the flow direction of the fluid, wherein the securing mechanism locks the sliding sleeve and completely opens the valve, wherein, in order to decouple the coupling from the tank nipple, the pressure of the fluid is lowered, the valve sleeve overcomes a filling pressure of the fluid in a spring-force driven manner, and the valve sleeve and the sliding sleeve are then displaced in the flow direction of the fluid via a hand lever mechanism, wherein the valve closes, the securing mechanism blocks the valve sleeve and releases the sliding sleeve, and the sliding sleeve is then moved into its first position.

22. The method according to claim 21, in which a sequence of the refueling process is displayed on an LED display of the coupling.

23. The method according to claim 21, in which a refueling start request is sent to a dispenser via a start button of the coupling.

24. A use of a coupling according to claim 1 for refueling vehicles with gaseous fluids.

25. The use according to claim 24, wherein the gaseous fluids include hydrogen.

* * * * *